(12) United States Patent
Frerebeau et al.

(10) Patent No.: US 8,191,167 B2
(45) Date of Patent: May 29, 2012

(54) SECURE SYSTEM AND METHOD FOR PROCESSING DATA BETWEEN A FIRST DEVICE AND AT LEAST ONE SECOND DEVICE PROVIDED WITH MONITORING MEANS

(75) Inventors: Laurent Frerebeau, Paris (FR); Daniel Le Metayer, Meylan (FR)

(73) Assignee: Trusted Logic Mobility (SAS), Meudon (FR)

( * ) Notice: Subject to any disclaimer, the term of this patent is extended or adjusted under 35 U.S.C. 154(b) by 649 days.

(21) Appl. No.: 12/297,934

(22) PCT Filed: Apr. 20, 2007

(86) PCT No.: PCT/FR2007/000672
§ 371 (c)(1),
(2), (4) Date: Apr. 14, 2009

(87) PCT Pub. No.: WO2007/122329
PCT Pub. Date: Nov. 1, 2007

(65) Prior Publication Data
US 2009/0313701 A1 Dec. 17, 2009

(30) Foreign Application Priority Data
Apr. 21, 2006 (FR) ...................................... 06 03582

(51) Int. Cl.
*G06F 1/26* (2006.01)
*G06F 11/00* (2006.01)
*G08B 13/00* (2006.01)
*G08B 21/00* (2006.01)
*G08B 29/00* (2006.01)

(52) U.S. Cl. ................ 726/34; 726/23; 726/24; 726/25; 713/187; 713/188
(58) Field of Classification Search .............. 726/22–36; 713/150–181, 187–194
See application file for complete search history.

(56) References Cited

U.S. PATENT DOCUMENTS
5,715,403 A * 2/1998 Stefik .............................. 705/44
(Continued)

FOREIGN PATENT DOCUMENTS
EP 1 055 988 11/2000
(Continued)

OTHER PUBLICATIONS
International Search Report dated Nov. 30, 2007, in French application.

*Primary Examiner* — Brandon Hoffman
*Assistant Examiner* — Jayesh Jhaveri
(74) *Attorney, Agent, or Firm* — Young & Thompson

(57) ABSTRACT

A secure system (1) for processing data includes a first device (2), and at least one second device (3) is characterized in that—each second device (3) comprises monitoring elements (7) suitable for transmitting operating information to the first device (2), and—the first device (2) includes elements (8) for storing a behavioral model of each second device (3) and elements (9) for comparing the operating information received from each second device (3) with the behavioral model so as to determine whether the operation of the second device (3) is compliant with the behavioral model stored, and validation elements (10) suitable for preventing the running of a sensitive operation on this second device or for instructing a change of state of the second device if the second device does not manifest compliant operation. A method and a computer program are also described.

22 Claims, 1 Drawing Sheet

U.S. PATENT DOCUMENTS

| | | | |
|---|---|---|---|
| 6,327,652 B1 | 12/2001 | England | |
| 6,993,663 B1 * | 1/2006 | Paya et al. | 711/163 |
| 7,444,677 B2 * | 10/2008 | Marr | 726/22 |
| 7,587,724 B2 * | 9/2009 | Yeap | 719/328 |
| 7,603,704 B2 * | 10/2009 | Bruening et al. | 726/22 |
| 7,975,306 B2 * | 7/2011 | Chess et al. | 726/25 |
| 2002/0095660 A1 * | 7/2002 | O'Brien et al. | 717/127 |
| 2002/0112175 A1 * | 8/2002 | Makofka et al. | 713/200 |
| 2004/0225601 A1 * | 11/2004 | Wilkinson | 705/39 |

FOREIGN PATENT DOCUMENTS

| | | |
|---|---|---|
| EP | 1159662 | 1/2004 |
| WO | 00/54126 | 9/2000 |

* cited by examiner

SECURE SYSTEM AND METHOD FOR PROCESSING DATA BETWEEN A FIRST DEVICE AND AT LEAST ONE SECOND DEVICE PROVIDED WITH MONITORING MEANS

BACKGROUND OF THE INVENTION

1. Field of the Invention

The present invention relates to a secure system for processing data comprising a first device and at least one second device, the devices comprising command and communication means and the command and communication means of the first device being secure. It also relates to the corresponding devices, an operating method of the system and an associated computer programme.

2. Description of the Related Art

When an electronic system including various peripherals, such as a VDU, a keyboard, a disc, . . . is responsible for a security processing operation, such as authentication of a user, a commercial transaction, an electronic signature, a vote, or providing protected multimedia contents, and when this processing operation requires the use of one or more of those peripherals, the system must check the security status of those peripherals at the time at which they are required for this security processing operation.

Establishing the security status of a peripheral is all the more difficult because the peripheral may be removable, that is to say, physically detachable from the core of the system, and because it does not necessarily share its resources (memory space, registers, caches, etc.) with those which must verify the integrity thereof. Typically, a large number of systems are nowadays constituted by a core and "attached" peripherals which are associated with the core by means of, for example, USB connections or wireless connections. Besides the authentication of the peripherals when they become associated with the system, the core of the system must obtain guarantees relating to the effective security status of those "attached" components when they become involved in a sensitive processing operation. Typically, the core of the system may need to check, at the desired time, that a specific peripheral has been initialised by following a confidence procedure, that the code of that peripheral is always secure, that those data are always uninfected and that that peripheral is in a specific operating mode, which is clearly defined and controlled.

In order to solve this problem, a first solution has been proposed for the core of the system, by providing a logical partitioning mechanism, and optionally a physical partitioning mechanism, ensuring that the sensitive elements of this core are isolated from the non-sensitive elements of the system, and that they are accessible from the non-sensitive elements of the system by way of a secure communication channel via the partitioning mechanism. The partitioning mechanism further allows execution of the sensitive elements in a privileged mode, affording them access to facilities and resources of the system which are not accessible to the non-sensitive elements.

In addition, the core and the peripherals may carry out pairing methods which are typically based on sharing a secret key, those methods allowing authentication of the two portions and the embedding or the encryption of their exchanges.

However, those solutions do not overcome the problem of the knowledge by the core of the system, at a given time during its execution, of the security status of one of its peripherals when the core in question does not directly have access to the memory resources and other internal elements of that peripheral which would allow it to obtain directly guarantees concerning the effective security status of the peripheral to be monitored.

SUMMARY OF THE INVENTION

Therefore, the object of the invention is to provide a system which is capable of providing a first device with guarantees concerning the security status of another (or of several other) device(s) which may or may not be removable so as to allow the first device to decide whether the other device(s) may execute sensitive operations.

To that end, the invention relates to a secure system for processing data comprising a first device comprising secure command and communication means, and at least one second device comprising means for commanding and communicating with the first device, characterised in that:

the command and communication means of each second device comprise monitoring means for transmitting to the first device pieces of operating information from the second device, the monitoring means of each second device comprising confidence code which is inserted into the main code of the second devices, and the secure command and communication means of the first device comprise means for storing a behaviour model of each second device and means for comparing the pieces of operating information received from each second device with the behaviour model of the second device so as to establish whether or not the operation of the second device complies with the stored behaviour model, and validation means which are capable of preventing the launch of a sensitive operation on the second device or commanding a change in the status of the second device if the comparison means have established that the second device does not demonstrate compliant operation.

According to other features of the invention:

the confidence code comprises code portions which are interleaved with the main code, one or more portions being positioned at one or more critical locations of the main programme so that, when the main code is executed, when a critical location is reached the confidence code portion positioned at that location is also executed:

the confidence code comprises a part which is configured to receive test data from the first device and to write the test data to one or more predetermined memory locations, and one or more of the confidence code portions which are interleaved with the main code are configured to access, when they are executed, the test data in order to modify them, the main code is configured not to read or write to the predetermined memory locations which are intended to receive the test data, the test data transmitted by the first device are constituted by one or more random numbers, the pieces of operating information particularly comprise the test data which are modified by the interleaved portions of the confidence code, the confidence code is reassembled in specific libraries which are called up by a confidence code portion integrated in the main code, the confidence code is neutral with respect to the main code, verification that the operation of the second device complies with the stored behaviour model comprises verification of the integrity of some portions of the code of the second device, verification that the operation of the second device complies with the stored behaviour model comprises verification of the integrity of some portions of the data of the second device, verification that the operation of the second device complies with the stored behaviour model comprises verification of the authenticity of the second device, verification that the operation of the second device complies with the stored behaviour model comprises verification that the security status of the second device is sufficient to carry out a sensitive operation, the communication means of the first and second devices are capable of securing the information exchanges between them, the means for securing the information exchanges between the first and second devices comprise the transmission of a random value by the first device, the use of the random value by the command means of the second device before sending to the first device a result which is dependent on the random value, and validation of the result by the first device by comparison with an expected result as a function of the random value, the monitoring means of the second device are actuated by a command which is transmitted by the secure command and communication means of the first device, the monitoring means of the second device can transmit, at their own initiative, pieces of operating information to the secure means of the first device and the monitoring means of the second device are actuated, at least, when the second device is installed or when it first interacts with the first device.

The invention also relates to a secure method for processing data between a first device comprising secure command and communication means and at least one second device which comprises means for commanding and communicating with the first device, characterised in that it comprises the steps of:

storing a behaviour model of each second device in the first device;

transmitting, from each second device to the first device, pieces of operating information concerning the second device, the pieces of operating information being transmitted by a confidence code which is inserted into the main code of the second devices;

comparison, by the first device, of the pieces of operating information received with the behaviour model which is stored by the corresponding second device;

authorising the launch of a sensitive operation on the second device if, and only if, the comparison has detected that the operation of the second device complies with the stored behaviour model thereof.

According to other features of the invention:

the confidence code comprises code portions which are interleaved with the main code, one or more portions being positioned at one or more critical locations of the main programme and, when the main code is executed, when a critical location is reached, the confidence code portion positioned at that location is also executed, a part of the confidence code receives test data from the first device and writes the test data to one or more predetermined memory locations, and one or more of the confidence code portions which are interleaved with the main code have access, when they are executed, to the test data in order to modify them, when the main code is executed, only the confidence code reads and writes to the predetermined memory locations which are intended to receive the test data, the test data transmitted by the first device are constituted by one or more random numbers, the confidence code is reassembled in specific libraries which are called up by a confidence code part which is integrated in the main code and the confidence code is neutral with respect to the main code.

The invention also relates to a computer programme comprising programme code instructions for executing the steps of a method according to the invention when the programme is executed on a computer.

BRIEF DESCRIPTION OF THE DRAWING FIGURES

The invention will be better understood from a reading of the following description which is given purely by way of example and with reference to the drawings, in which.

Figure 1:
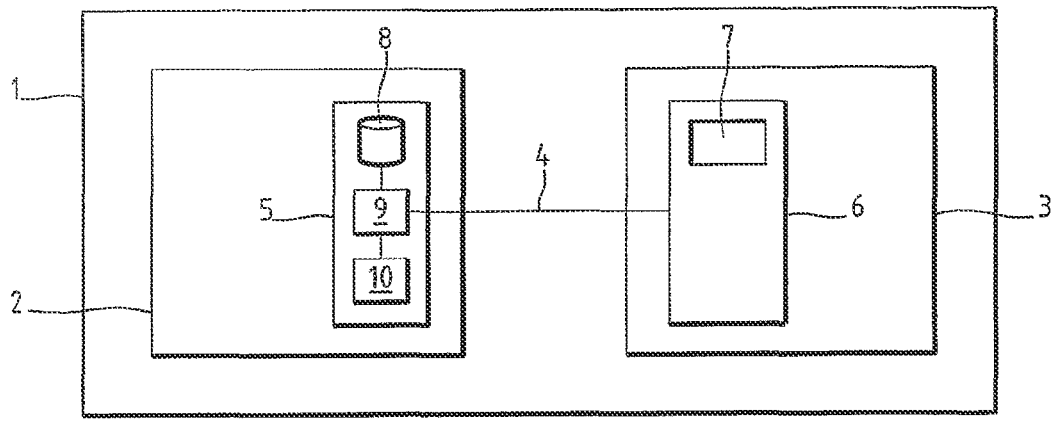
FIG. 1 is a schematic view of a data processing system according to one embodiment of the invention.

With reference to FIG. 1, a system 1 for processing data comprises a first device 2.

The first device 2 is connected to at least one second device 3.

DETAILED DESCRIPTION OF THE INVENTION

Typically, the first device may be a motherboard of a personal computer, the central processing unit of a telecommunications terminal, an application processor of a mobile telephone and the second device 3 is a peripheral (or a specialised processor) which is connected to the motherboard or the central processing unit by a data connection 4.

For reasons of clarity, only one peripheral is illustrated, but it is well known that a data processing system comprises a plurality of peripherals which have various functions from management of the man/machine interface to storage of data, including networking the system or processing specific operations (encoding, communications, etc.).

The data connection 4 may be of the internal interface type such as, for example, the PCI or AGP standards, or of the external interface type such as, for example, the USB or Bluetooth standards.

The first device 2 comprises secure command and communication means 5, for example, in the form of a security module or in the form of a specific operating mode of the central processing unit which allows a privileged secure operating mode to be ensured.

The second device 3 comprises command and communication means 6 which are composed of hardware and software elements. However, they are not necessarily secure.

Most peripherals are developed with the object of fulfilling a particular functionality without any specific security demands on their operation.

Therefore, in a step before they are made available for secure applications, their command and communication means 6 are adapted so that they comprise monitoring means 7.

The monitoring means 7 are formed, for example, by a confidence code which is inserted at least partially in the main control code of the second device. That confidence code is neutral with respect to the main code and does not bring about any side effect on the functional behaviour of the second device.

The confidence code comprises two parts. A first part, referred to as the interface part, serves to communicate with the secure means 5 of the first device.

The interface part is particularly configured to receive commands requesting pieces of information and to respond to them.

In this manner, the interface part is configured to read the content of some memory zones or the report of a specific operation, in particular the correct execution of the initialisation of the second device, and to respond to the first device 2 by providing those pieces of information.

The interface part is also configured to read and write test data received from the secure means 5 to one or more predetermined memory locations so that the second part of the confidence code can have access thereto, as will be described. Preferably, those memory locations are specific to the confidence code, that is to say that the main code is configured not to read or write to those memory locations.

The interface part may be completely or partially outside the main code: it does not need to be interleaved with the main code like the second part which will now be described.

The second part of the confidence code, referred to as the core part, serves to test the correct running of the main code, and consequently the integrity thereof.

The second part is split into one or more portions which are positioned at one or more critical locations. In this manner, when the main code is executed, when a critical location is reached the confidence code portion positioned at that location is also executed.

The insertion of the second part of the confidence code in the main code is carried out manually or in an automatic or semi-automatic manner after analysis of the main code. The analysis is carried out, for example, by means of static programme analysis tools. Static analysis techniques are numerous and well known: abstract interpretation, control flow analyses, data flow analyses, model checking, formal proofs, etcetera.

Static analysis of a programme particularly allows establishment of its control flow—that is to say, a representation of the possible execution paths of the programme—and its data flows, that is to say, the values of variables, registers, memories, expressions and states of the programme at various locations of an execution path.

Therefore, the analysis tools allow identification of the critical locations of the main code. By way of non-limiting examples, the critical locations are locations preceding a modification or access to a piece of sensitive data, or transmission of sensitive data to a port of the second device.

The core part of the confidence code is completely interleaved with the main code and/or reassembled in specific libraries which are called up by the confidence code portion which is integrated in the main code.

One or more of the portions, and if necessary all of the portions, of the core part access, when they are executed, the test data in order to modify them.

The value of the test data therefore depends on the order in which the portions have modified them and therefore the order in which the main code has been executed.

In this manner, the test data provide an indication relating to the integrity of the second device 3.

It will be noted that the value of the test data depends on the state in which the main code is, that is to say, the location at which it is in the course of its execution.

In this manner, the test data also provide an indication relating to the state of the second peripheral 3.

The secure means 5 of the first device 2 comprise means 8 for storing a behaviour model of the second device 3. The behaviour model takes into account not only the main code, but also the inserted confidence code.

They also comprise means 9 for comparing an expected value in accordance with the behaviour model with the value of the test data received in the pieces of operating information transmitted by the interface part of the confidence code.

The comparison allows establishment of whether the operation of the second device 3 complies with the behaviour model and whether the second device is in a secure state which is sufficient for carrying out some sensitive operations.

The secure means 5 also comprise validation means 10 which allow a sensitive operation involving the second device 3 to be executed only if the comparison has established that the second device 3 has compliant operation and if it is in a sufficient state of security. Those validation means 10 may also command a change in the status of the second device if the comparison has established that it is not in a sufficient state of security.

Figures 2, 3:
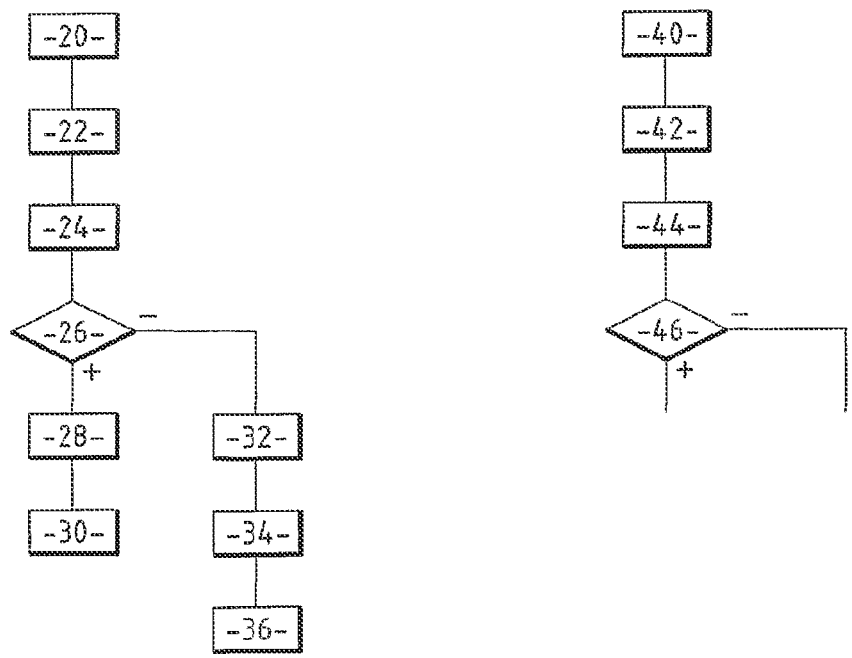
FIG. 2 is a flow chart of the operating method of the system of FIG. 1.
FIG. 3 is a flow chart of one embodiment for securing data.

In this manner, the operation of the system 1 is typically (FIG. 2) a method according to the following steps.

When the first device 2 operates, the secure command and monitoring means 5 establish at 20 that a sensitive operation has to be executed by the second device 3.

They transmit at 22 one or more commands requesting pieces of information to the monitoring means 7 and, more precisely, to the interface part of the confidence code.

The command comprises a piece of test data which the interface part stores in the memory locations of the second device provided for that purpose.

At the end of a given length of time, the monitoring means 7 transmit in response, step 24, the requested pieces of operating information.

Those pieces of operating information comprise the test data which are modified by the second part and additional pieces of information. The additional pieces of information are collected by the interface part and comprise, for example, the contents of some memory zones to which the main code has access.

The pieces of information, and particularly the value of the test data which are modified, are compared at 26 with the pieces of information of the behaviour model stored at 8 by the first device 2.

If the pieces of information comply with what is expected in view of the behaviour model and if the second device is adjudged to be in a sufficient state of security, the status of the second device 3 is validated at 28 and the sensitive operation is executed at 30 by the second device.

On the other hand, if the pieces of information do not comply, the second device 3 is considered at 32 to be in an insufficient or doubtful state of security and the sensitive operation is blocked at 34; a warning message may also be transmitted at 36 to the user or a command for a change in status sent to the second device.

The efficacy of the system is based on the quality of the pieces of operating information transmitted to the first device 2.

Therefore, in order to prevent any risk of interception and/or modification of those pieces of data, they can be secured, that is to say, protected—typically authenticated or encrypted.

That can be brought about punctually, for each piece of data, or the communication means of the first and second devices secure the transmission of the pieces of information by producing, for example, an encrypted tunnel.

Another security variant involves using the so-called "challenge/response" technique which is well known to the person skilled in the art.

In that case, the pieces of test data transmitted by the first device 2 are constituted by one or more random number(s).

The second device 3 uses, at 42, the random number in its calculations and sends the result to the first device 2.

The first device studies, at 44, the result received. In that result, there must be at 46 a specific piece of information corresponding to a predetermined calculation carried out with the random number. If that piece of information is present, this implies that the device which processed and sent the pieces of information was indeed the second device.

This technique advantageously allows prevention of "replay" stratagems which could be used by a third party who monitors the data connection 4 and who could therefore attempt to pass himself off as the second device after retrieving the pieces of information from previous exchanges.

It is also desirable to ensure that the monitoring means have not been modified or short-circuited. Therefore, the pieces of operating information requested may include a request for a signature of the monitoring means.

This signature involves, for example, using the random value received from the first device during the entire execution of the confidence code, applying to it various processing operations which are known to the first device and which can be recalculated thereby, those pieces of information naturally being able to include pieces of information concerning the status of the second device.

That advantageously complicates the reconstruction of a valid response of the confidence code by a malicious person who may have followed the existence thereof and who may have understood the operation of the construction of a response of the confidence code to the first device.

As indicated above, the typical operation of the system involves, for the secure means 5 of the first device, sending a command to which the monitoring means 7 of the second device 3 respond.

However, it is also possible for the monitoring means 7 to take the initiative in sending pieces of information to the secure means 5, or messages which expect a response from the first device, the response then being able to be used by the second device to manage its security status or to restrict access to some of its resources.

That operating mode is particularly relevant when the second device comprises a security module which acts as a monitoring means or, generally, when the monitoring means may be secured.

The system described is particularly suitable for any system for processing data which has to exchange confidential pieces of information with various peripherals which may be detachable or non-detachable.

Typically, cellular telephones, audio, video or multimedia readers, bank payment terminals or portable payment terminals, personal digital assistants and domestic routing gateways are systems of this type.

The secure method for processing data thus described is therefore executed by a data-processing device under the command of software instructions of a computer programme. The programme may be stored in or transmitted by a data carrier. This can be a piece of storage hardware, such as a CD-ROM, a magnetic disc or a hard disc, or a transmittable carrier, such as an electrical, optical or radio signal.

The invention claimed is:

1. A secure system for processing data comprising a first device which comprises means for secure command and communication and at least one second device which comprises means for commanding and communicating with the first device, wherein:

the means for commanding and communication of each second device comprise means for monitoring for transmitting to the first device pieces of operating information from the second device, the means for monitoring of each second device comprising a confidence code which is inserted into a main code of the second devices, the means for secure command and communication of the first device comprise means for storing a behavior model of each second device and means for comparing pieces of operating information received from each second device with the behavior model of the second device so as to establish whether or not operation of the second device complies with the stored behavior model, and means for validation which are capable of preventing a launch of a sensitive operation on the second device or commanding a change in status of the second device if the means for comparing have established that the second device does not demonstrate compliant operation, and the confidence code comprises two parts, such that the confidence code comprises code portions which are interleaved with the main code, one or more portions being positioned at one or more critical locations of a main program so that, when the main code is executed, when a critical location is reached the confidence code portion positioned at that location is also executed, and the confidence code comprises a part which is configured to receive test data from the first device and to write the test data to one or more predetermined memory locations, and one or more of the confidence code portions which are interleaved with the main code are configured to access, when they are executed, the test data in order to modify them.

2. The secure system according to claim 1, wherein the main code is configured not to read or write to the predetermined memory locations which are intended to receive the test data.

3. The secure system according to claim 1, wherein the test data transmitted by the first device are constituted by one or more random numbers.

4. The secure system according to claim 1, wherein the pieces of operating information particularly comprise the test data which are modified by the interleaved portions of the confidence code.

5. The secure system according to claim 1, wherein the confidence code is reassembled in specific libraries which are called up by a confidence code portion integrated in the main code.

6. The secure system according to claim 1, wherein the confidence code is neutral with respect to the main code.

7. The secure system according to claim 1, wherein verification that the operation of the second device complies with the stored behavior model comprises verification of the integrity of some portions of the code of the second device.

8. The secure system according to claim 1, wherein verification that the operation of the second device complies with the stored behavior model comprises verification of the integrity of some portions of the data of the second device.

9. The secure system according to claim 1, wherein verification that the operation of the second device complies with the stored behavior model comprises verification of the authenticity of the second device.

10. The secure system according to claim 1, wherein verification that the operation of the second device complies with the stored behavior model comprises verification that the security status of the second device is sufficient to carry out a sensitive operation.

11. The secure system according to claim 1, wherein the communication means of the first and second devices are capable of securing the information exchanges between them.

12. The secure system according to claim 11, wherein the means for securing the information exchanges between the first and second devices comprise the transmission of a random value by the first device, the use of the random value by the command means of the second device before sending to the first device a result which is dependent on the random value, and validation of the result by the first device by comparison with an expected result as a function of the random value.

13. The secure system according to claim 1, wherein the means for monitoring the second device are actuated by a command which is transmitted by the secure command and communication means of the first device.

14. The secure system according to claim 1, wherein the means for monitoring the second device can transmit, at their own initiative, pieces of operating information to the secure means of the first device.

15. The secure system according to claim 1, wherein the means for monitoring of the second device are actuated, at least, when the second device is installed or when it first interacts with the first device.

16. A secure method for processing data between a first device comprising means for secure command and communication and at least one second device which comprises means for commanding and communicating with the first device, comprising the steps of:
   storing a behavior model of each second device in the first device;
   transmitting, from each second device to the first device, pieces of operating information concerning the second device, the pieces of operating information being transmitted by a confidence code which is inserted into a main code of the at least one second device;
   comparing, by the first device, of the pieces of operating information received with the behavior model which is stored by the corresponding second device; and
   authorizing a launch of a sensitive operation on the second device if, and only if, the comparing has detected that the operation of the second device complies with the stored behavior model thereof,
   wherein the confidence code comprises two parts, such that the confidence code comprises code portions which are interleaved with the main code, one or more portions being positioned at one or more critical locations of a main program so that, when the main code is executed, when a critical location is reached the confidence code portion positioned at that location is also executed, the confidence code comprises a part which is configured to receive test data from the first device and to write the test data to one or more predetermined memory locations, and one or more of the confidence code portions which are interleaved with the main code are configured to access, when they are executed, the test data in order to modify them.

17. The secure method according to claim 16, wherein, when the main code is executed, only the confidence code reads and writes to the predetermined memory locations which are intended to receive the test data.

18. The secure method according to claim 16, wherein the test data transmitted by the first device are constituted by one or more random numbers.

19. The secure method according to 16, wherein the confidence code is reassembled in specific libraries which are called up by a confidence code part which is integrated in the main code.

20. The secure method according to claim 16, wherein the confidence code is neutral with respect to the main code.

21. A computer program comprising program code instructions for executing the steps of the method according to claim 16 when the program is executed on a computer, the computer program being stored in a non-transient machine-readable medium.

22. A secure system for processing data comprising:
   a first device configured for secure command and communication; and
   at least one second device configured for commanding and communicating with the first device, the at least one second device including an apparatus adapted to monitor for transmitting to the first device pieces of operating information from the second device, the at least one second device including a confidence code which is inserted into a main code of the second devices,
   wherein the first device is configured to store a behavior model of each second device so as to compare pieces of operating information received from each second device with the behavior model of the second device so as to establish whether or not operation of the second device complies with the stored behavior model, and a validation apparatus capable of preventing a launch of a sensitive operation on the second device or commanding a change in status of the second device if comparison has established that the second device does not demonstrate compliant operation, and
   the confidence code comprises two parts:
      a first part which is an interface part, configured for secure command and communication with the first part and to receive commands requesting pieces of information and to respond to the commands, and
      a second part which is a core part, which is configured to test correct running of a main code, the second part being split into one or more portions which are positioned at one or more critical locations, such that when the main code is executed, when a critical location is reached the confidence code portion positioned at the critical location is executed.

* * * * *